(No Model.) 2 Sheets—Sheet 2.

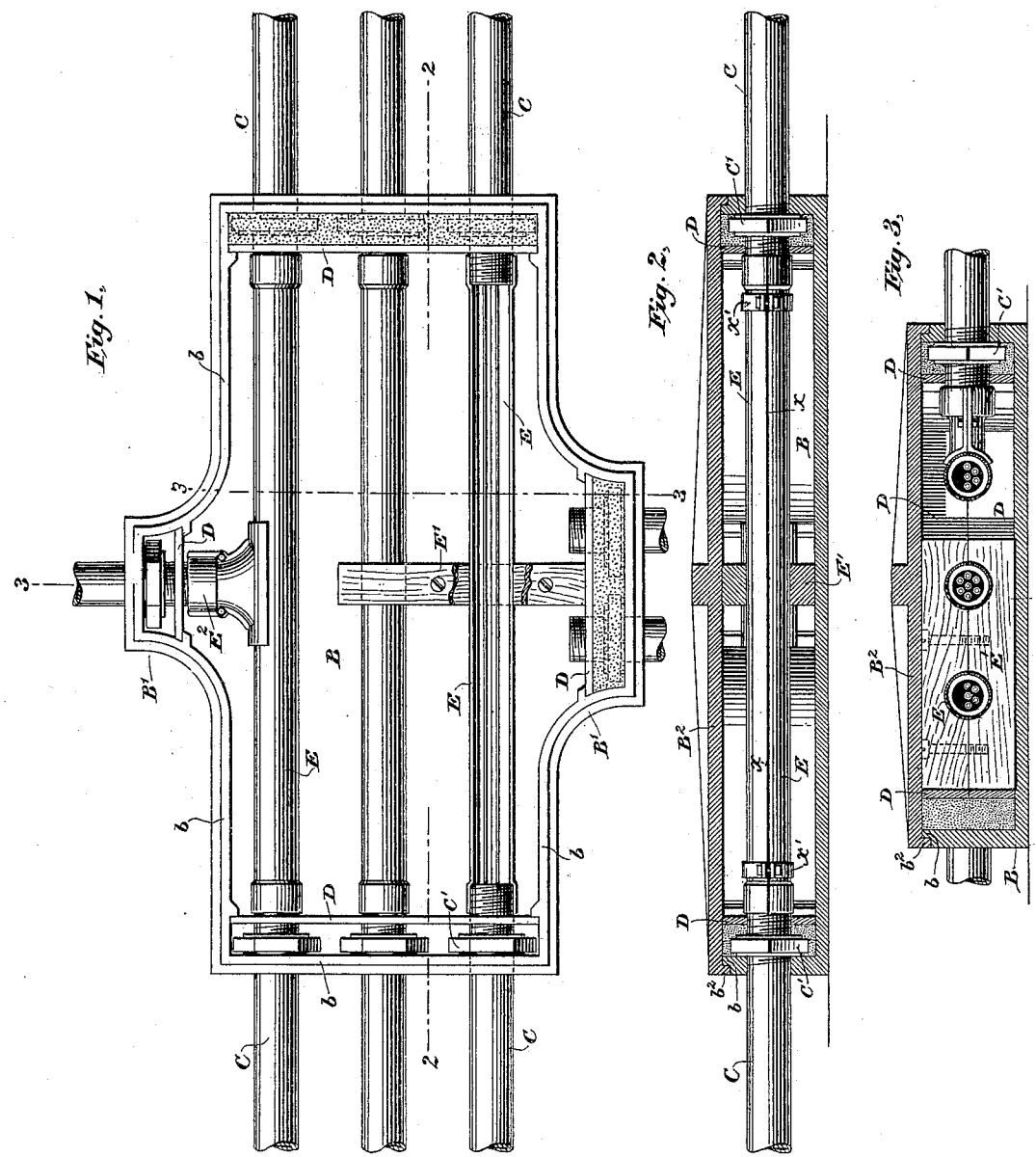

W. H. HART.
ELECTRICAL DISTRIBUTION BOX.

No. 488,198. Patented Dec. 20, 1892.

Witnesses
Geo. W. Breck.
Henry W. Lloyd.

Inventor
William H. Hart
By his Attorneys
Baldwin, Davidson & Wight

UNITED STATES PATENT OFFICE.

WILLIAM H. HART, OF BROOKLYN, NEW YORK.

ELECTRICAL DISTRIBUTION-BOX.

SPECIFICATION forming part of Letters Patent No. 488,198, dated December 20, 1892.

Application filed March 22, 1890. Serial No. 344,912. (No model.)

*To all whom it may concern:*

Be it known that I, WILLIAM H. HART, of Brooklyn, in the county of Kings and State of New York, have invented certain new and useful Improvements in Electrical Distribution-Boxes, of which the following is a specification.

My invention relates to that system of underground distribution in which the wires are threaded through ducts, and in which distribution boxes are employed. In threading wires through such ducts it frequently becomes necessary to force the "pilot" through the ducts and across distribution boxes from duct to duct. Difficulty is frequently encountered in doing this as the pilot is liable to spring out of line in crossing the boxes and thus cause trouble and delay.

One object of my invention is to obviate this difficulty and to provide means not only for threading the rods or wires accurately across the boxes but also to render the interior of the conduit and the wires readily accessible in order to make connections. This end I attain by providing sectional pipes connecting the ducts across the interior of the boxes, as presently described.

Another object of my invention is to hold the terminals of the ducts securely in position relatively to the distribution boxes and to prevent access of moisture to the conduit through the joints. These ends I attain by inserting the ends of the ducts or pipes through the sides of the distribution boxes, below the upper edge thereof, securing them in position therein. This may be accomplished by jam-nuts screwed thereon between the outer wall of the distribution box and partition that are preferably removable and sectional and through which the inner ends of the ducts project, and filling the space thus formed with any suitable cement or moisture resisting or repelling composition.

Another object of my invention is to render the distribution box readily accessible even when some distance below the surface of the pavement, and to prevent the infiltration of moisture therein.

These ends I attain by providing the distribution box with a raised bead or flange that may be overlapped by a corresponding bead or flange on the bottom of a hood, the upper part of which is provided with an internal flange and gasket on which a covering plate rests, which covering plate may be coated with paraffine or some equivalent material that prevents moisture collecting or freezing on the top of the box; and covering the hole with a suitable lid or cover.

The subject-matter claimed is hereinafter specifically designated.

Figure 4:
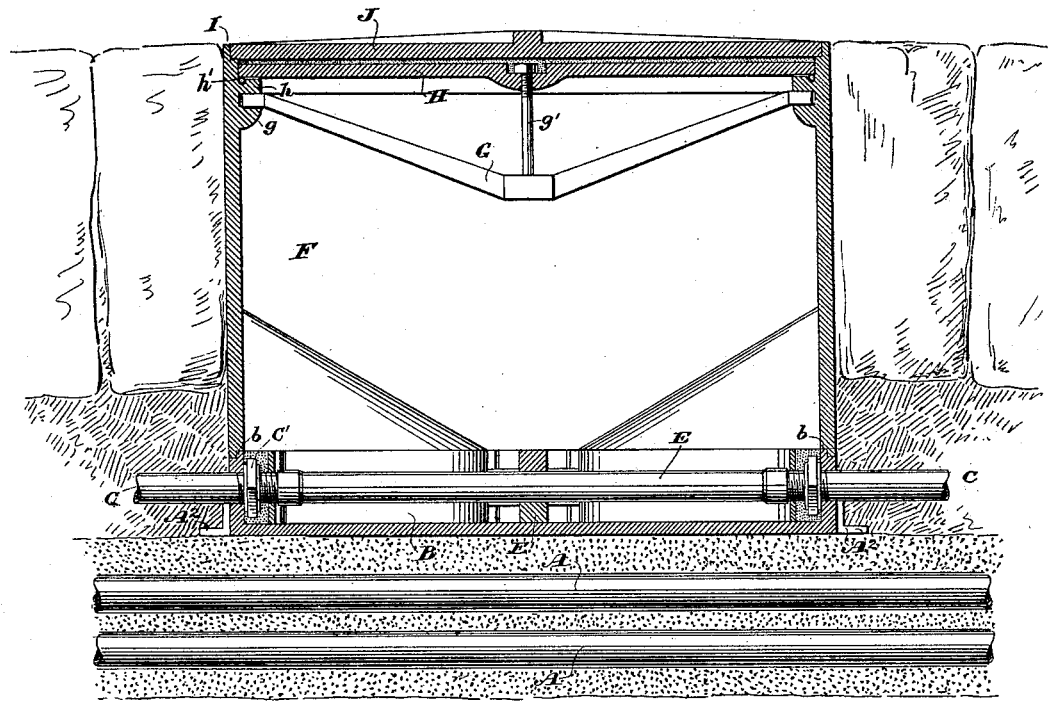
Figure 6:
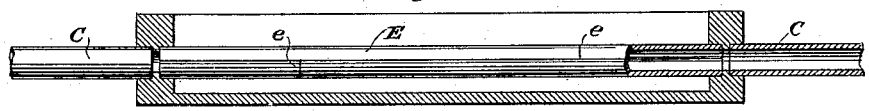
Figure 5:
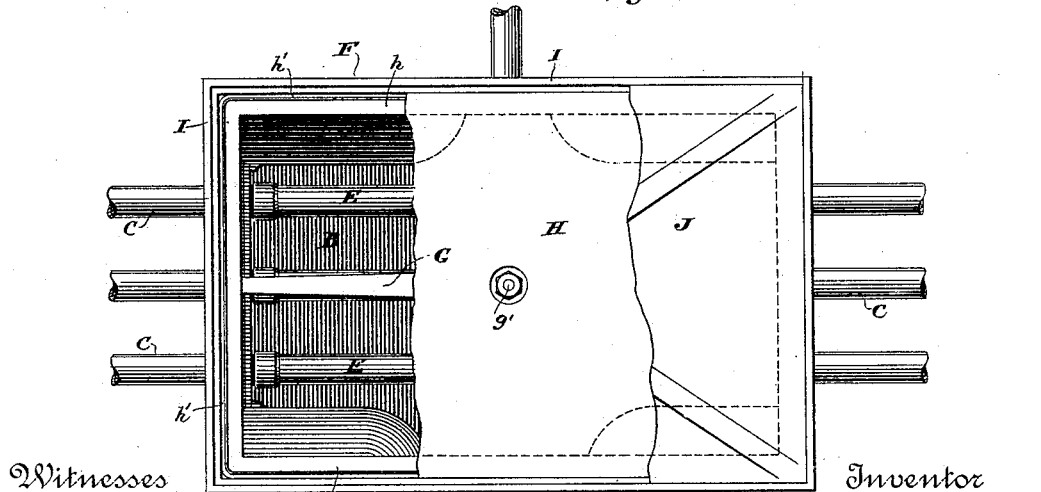

In the accompanying drawings which represent so much of my improved apparatus as is necessary to illustrate the subject-matter herein claimed; Figure 1 represents a plan or top view of the distribution box with the cover and one of the upper sections of the connecting pipe removed showing the conductor therein. Fig. 2 is a vertical central longitudinal section through the distribution box on the line 2, 2, of Fig. 1. Fig. 3 a transverse section through the same on the line 3, 3, of Fig. 1. Fig. 4 is a longitudinal section showing the distribution box as resting on the top of a system of through ducts. Fig. 5 is a plan view of the box with its lids broken away at different points in order to show the construction of the parts beneath them. Fig. 6 is a sectional view showing a modified way of leading the ducts or pipes into the box.

The distribution box B is preferably made of an oblong shape with lateral projections B' for the connection of lateral ducts, and is preferably of a depth much less than its width or length and with a vertical bead or flange $b$ around its edge. The ends of the ducts C are screw-threaded and inserted through the vertical walls of the box below the upper edge thereof into which they may project an inch or so. The jam nuts C' hold these ends firmly in position. The inner ends of the conduits project through the horizontally divided partition D parallel with the external wall of the box and the jam nuts are in the space between the wall and partition. This space is filled in with any suitable cement or moisture resisting material. The space between the inner terminals of opposite ducts is bridged by a removable longitudinally divided pipe E the enlarged ends of which overlap the projecting ends of the ducts while their intermediate portions rest in suitable supports E' horizontally divided and notched so as to fit over the pipes and secured together by screw-bolts or other suitable fastenings. The joints of the longitudinally divided pipes may be rendered water-tight and the sections may be firmly secured together by packing $x$ and clamps $x'$ in any well known way.

Instead of having the ends of the pipes or ducts project into the box they might terminate within the openings in the walls of the box as shown in Fig. 6; and in that event the ends of the pipe sections E would rest in the openings. When this construction is adopted I would divide transversely each section as at $e$ to permit their ready placement and removal, but such divisions would preferably be as shown in the drawings and would not be coincident. By means of this construction it will be perceived that each duct is in effect prolonged across the box and yet each entire pipe crossing the box may readily be removed and replaced. A guideway across the box from duct to duct is thus provided and the proper and ready passage of the pilot across the box is insured.

In order to facilitate the connection of lateral pipes or ducts for leading out service wires, the bridging pipes above described may be provided with tubular lateral projections $E^2$ forming an integral part of the sectional bridge pipe, or connected therewith in any suitable manner. The tubular projections $E^2$, may be detachably secured to the lateral pipes or conduits in the manner illustrated in Fig. 1.

When the distribution box lies close to the surface it may be provided with a flanged cover $B^2$ provided with a flange $b^2$ overlapping the corresponding bead or flange of the box above described. It will be observed that the apertures in both walls of the box are below the upper edge thereof, that the jam nuts are also located below the upper edge of the box and are surrounded by a sealing material. The cover, when in place, therefore, does not rest on the jam nuts or interfere with the sealing material around them. When however the box is located some distance below the surface I substitute for the cover a box or hood F having a bottom flange similar to that on the cover and overlapping the corresponding flange on the distribution box. Near the top of the box F is the usual locking bar G supported on internal flanges $g$ and provided with a central spindle $g'$ which extends up through an opening in a lid H resting upon an internal flange $h$ provided with a groove in which a gasket $h'$ is inserted to make a tight joint. When in position this lid lies flush with the top of the shoulder running round the box and surrounded by an upwardly projecting external flange I. When the lid is in place its top is covered with a suitable coating of paraffine, cement, or other appropriate material impervious to moisture, and above this coating is placed the cover J flush with the roadway so as to afford no obstruction to street traffic. These lids or covers being of metal moisture collected thereon would be liable to congeal and freeze them together, which tendency is prevented by the interposed coating of paraffine above described. The top of the box may lie below the surface level of the street and be covered with the ordinary paving.

Having thus fully described the construction of my improved apparatus what I claim as my invention and desire to secure by Letters-Patent is:

1. The combination, substantially as set forth, of the box having double walls with a space between them and co-incident apertures in both walls below the edge of the box, the ducts or pipes passing through the external wall, jam-nuts or devices for securing the pipes, and sealing material surrounding the nuts and filling the space between the walls.

2. The combination, of the box having double walls with a space between them and co-incident apertures in both walls below the edge of the box, the pipes passing through both walls, pipe securing devices, and sealing material in the space between the two walls.

3. The combination, substantially as set forth, of the box having double walls with a space between them and co-incident apertures in the walls below the edge of the box, the pipes leading into the box, and sealing material between the walls.

4. The combination, substantially as set forth, of the box, the ducts or pipes leading thereinto, and the longitudinally divided removable bridging pipe connecting opposite ducts.

5. The combination, substantially as set forth, of the box, the ducts leading thereinto, the sectional removable bridging pipe connecting opposite ducts and the sectional supporting bridges on which the sectional pipes rest.

6. The combination, substantially as set forth, of the box, the ducts leading thereinto, and the longitudinally and transversely divided removable sectional bridging pipes connecting opposite ducts.

7. The combination of the box, the ducts leading thereinto, the sectional removable bridge pipe having a lateral tubular projection and connecting opposite ducts and the lateral outlets or service ducts leading from the box.

8. The combination, substantially as set forth, of the box, the ducts inserted therein being screw-threaded on their internally projecting ends, jam nuts thereon, partitions through which the inner ends of the ducts pass, water repelling material filling the space between the box wall and the partitions, sectional bridging pipes connecting corresponding terminals of opposite ducts, and horizontally divided intermediate supports or bridge pieces holding the bridge pipes in position.

9. The combination, substantially as set forth, of the box, the screw ended ducts extending therein, to the jam-nuts, the longitudinally divided bridge pipes connecting the terminals of opposite ducts, and the lateral tubular projections connecting the bridge pieces directly with the lateral ducts.

10. The combination, substantially as set forth, of the distribution box, its bead or flange, the covering box, its bead or flange, the internal lid, its water repelling coating, and the external lid or cover flush with the top of the box.

11. The combination, substantially as set forth, of the box, its internal lid flush with the shoulder thereon, the locking bar, the exterior cover, and the interposed moisture repelling coating applied between the two lids to prevent freezing and to repel moisture.

In testimony whereof I have hereunto subscribed my name.

WILLIAM H. HART.

Witnesses:
EDWARD C. DAVIDSON,
MAMIE J. KELLEY.